United States Patent [19]

Orphanides

[11] Patent Number: 4,482,690

[45] Date of Patent: Nov. 13, 1984

[54] PROCESS FOR THE PRODUCTION OF POLYURETHANE UREA ELASTOMERS

[75] Inventor: Gus G. Orphanides, Allentown, Pa.

[73] Assignee: Air Products and Chemicals, Inc., Allentown, Pa.

[21] Appl. No.: 578,735

[22] Filed: Feb. 9, 1984

[51] Int. Cl.$^3$ ............................................. C08G 18/38
[52] U.S. Cl. .................................... 528/64; 528/76; 528/77; 528/81; 528/83
[58] Field of Search .................. 528/64, 76, 77, 81, 528/83

[56] References Cited

U.S. PATENT DOCUMENTS

| | | | |
|---|---|---|---|
| 3,285,879 | 11/1966 | Larson et al. | 260/77.5 |
| 3,428,610 | 2/1969 | Klebert | 260/75 |
| 3,736,350 | 5/1973 | Meckel et al. | 260/471 |
| 3,846,351 | 11/1974 | Huffaker et al. | 260/2.5 |
| 4,133,943 | 1/1979 | Blahak et al. | 521/163 |
| 4,218,543 | 8/1980 | Weber et al. | 521/51 |
| 4,222,955 | 9/1980 | Chung et al. | 260/465 |

OTHER PUBLICATIONS

Preparation and Construction of Some Tert-Butyl–Acetylamino–Nitrobenzenes–Biekart, et al., Rec. Trao. Chim. 71, 321–339, (1952).

Primary Examiner—Maurice J. Welsh
Attorney, Agent, or Firm—R. L. Brewer; J. C. Simmons; E. E. Innis

[57] ABSTRACT

This invention pertains to the manufacture of polyurethane-urea elastomers formed by reacting a prepolymer of an organic polyisocyanate and a compound having at least two Zerewitenoff active hydrogen atoms with a chain extender comprising t-butylbenzenediamine. The utilization of t-butylbenzenediamine as an aromatic diamine chain extender imparts flexibility in the handling of reactable compositions due to an increase in pot life and imparts excellent tensile modulus to the resulting polymer.

5 Claims, 2 Drawing Figures

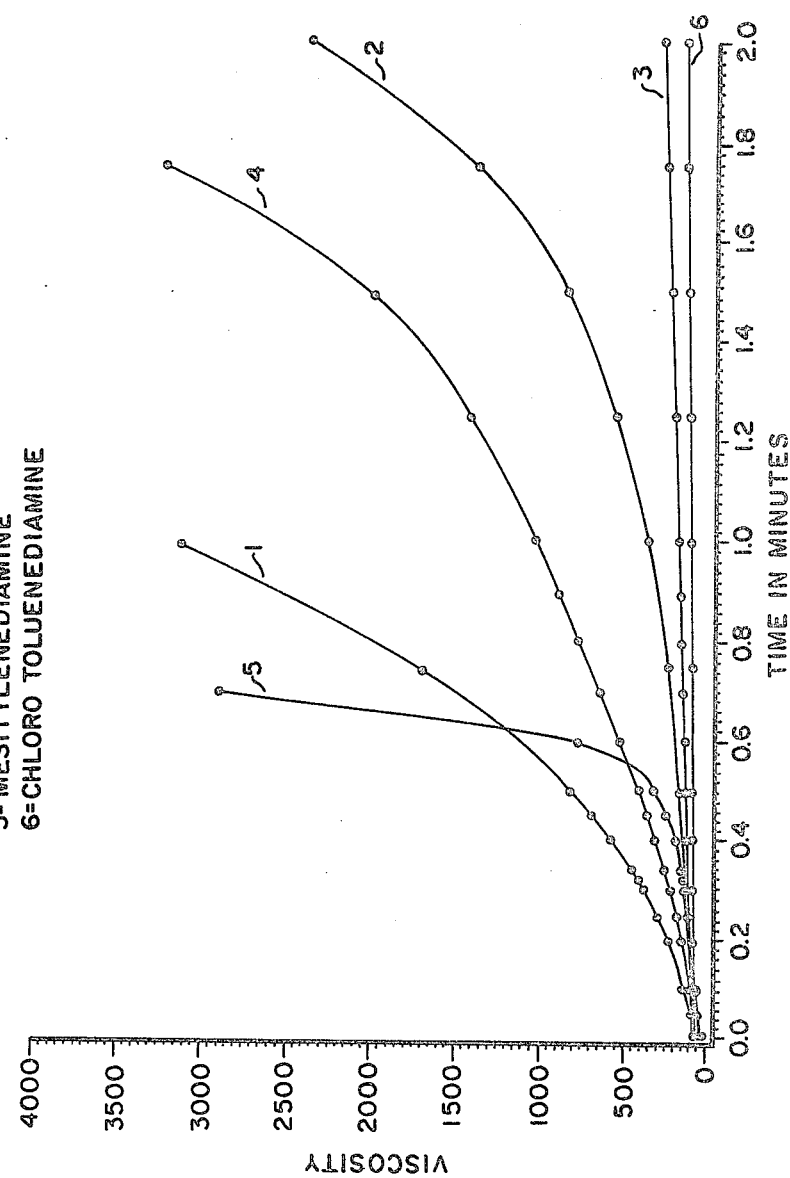

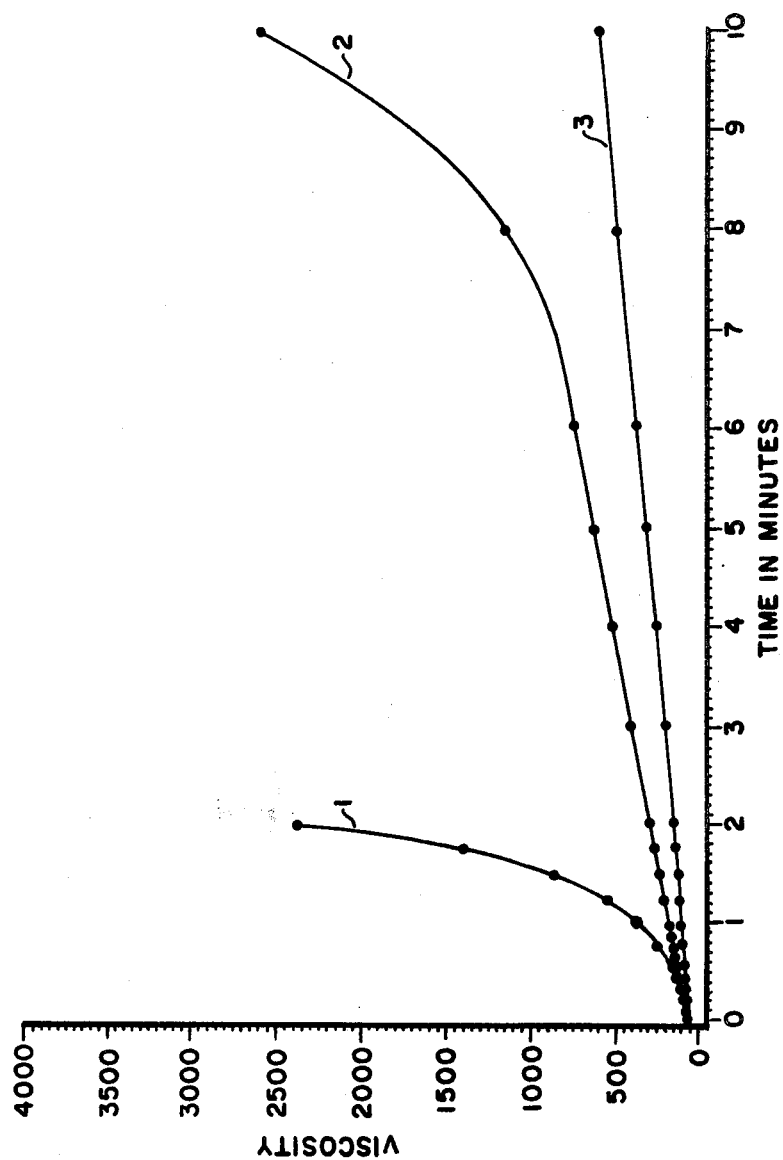

PROCESS FOR THE PRODUCTION OF POLYURETHANE UREA ELASTOMERS

BACKGROUND OF THE INVENTION

1. Technical Field

This invention pertains to the manufacture of polyurethane-elastomers polymerized with an aromatic diamine chain extending agent.

2. Description of the Prior Art

Polyurethane-urea elastomers have been widely used in the industry for the manufacture of molded parts, suitably for automobile grilles and bumpers, support mountings for headlights and tail lights and a host of other manufactured products.

Polyurethane urea elastomers for these applications typically are formed by reacting an organic polyisocyanate with a compound having molecular weight between 400–10,000 containing at least two Zerewitenoff active hydrogen atoms and an aromatic diamine chain extending agent. The aromatic diamine chain extender is incorporated into the polyurethane formulation to improve the structural stability, tensile strength, recoil elasticity and permanent elongation of the resulting resin. As is known, though, aromatic diamines containing primary amine functionality are highly reactive with isocyanate terminated polyurethane prepolymers formed from organic polyisocyanates and polyol prepolymers and are unsuited for molding large parts. For example, a reaction mixture comprising an isocyanate terminated prepolymer and toluene diamine as a chain extending agent must be formulated and molded immediately otherwise the reaction mixture may gel prior to molding.

Two techniques have been utilized to reduce the reactivity of aromatic diamines in order to formulate polyurethane area elastomer molding formulations. One technique involves incorporating organo substituents on the aromatic ring which sterically hinder the amine functionality; the other is to incorporate substituents on the aromatic ring which electronically deactivate the aromatic ring. Representative patents illustrating steric hinderance of the functionality as a mechanism for reducing activity are as follows.

U.S. Pat. Nos. 3,428,610 and 4,218,543 disclosure aromatic diamines having alkyl groups in the ortho position to the amine as e.g., diethyl toluene diamine, chain extenders for polyurethane. As noted in the '543 patent, many aromatic amines are not suited for reaction injection molding (RIM) of polyurethane urea forming elastomers because the pot life of the mixture is too short. The incorporation of alkyl groups ortho to the amine groups reduces the reactivity of the aromatic amine and thus makes them suited for many molded operations.

U.S. Pat. No. 3,846,351 discloses the utilization of secondary aromatic alkyl diamines as chain extenders and foam catalysts for polyurethane-urea elastomer forming compositions. N,N'-disec-butyl-p-phenylenediamine is one example of an amine having chain extending and catalytic activities. In this case, the primary amine functionality is converted to secondary amine functionality, which can affect the tensile modulus of the elastomer.

U.S. Pat. No. 3,285,879 discloses the utilization of N-monoalkyl aromatic diamines as a chain extending agent for polyurethane-urea elastomers. Two of the advantages stated by the patentee is that the N-monoalkyl aromatic diamines impart a practical pot life for the urethane-urea elastomer formulations and result in producing a soft, highly flexible rubbery product. An example of monoalkyl aromatic diamine is N-octyl-p-phenylenediamine. The procedure utilized here for reducing reactivity is similar to the '351 patent.

The second technique for reducing activity of an aromatic amine is through electronic deactivation of the ring. One of the better known aromatic diamine chain extenders utilizing ring deactivation to extend pot life to urethane-urea elastomer formulations is methylene-bis(orthochloroaniline) (MOCA). MOCA, of course, uses a chlorine atom to deactive the ring. Although MOCA has been widely used in the past it is finding disfavor in the industry because it is suspected of having carcinogenic characteristics. Other types of chain extenders have been utilizing electronic deactivation are:

U.S. Pat. No. 3,736,350 discloses aromatic diamines containing ester and halogen or alkoxy radicals. A representative structure follows:

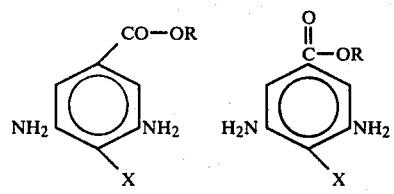

where R is an alkyl radical and X is an alkoxy radical having from 1 to 4 carbon atoms or a halogen atom. Representative chain extenders include 4-methoxy-3, 5-diaminobenzoic acid methylester; 4-aminobenzoic acid-(3'-chloro-4'-amino)-phenyl ester; and 4,4'-dichloro-3,3'-diamino diphenyl; carbonate.

U.S. Pat. No. 4,133,943 suggests various aromatic diamino carboxylic acid esters as chain extenders for urethane urea elastomers. A representative structure is

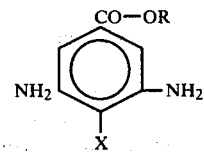

where R has aliphatic or cycloaliphatic and X is a halogen atom, alkoxy or trifluoromethyl radical.

U.S. Pat. No. 4,222,955 discloses various substituted aromatic diamines which are 3,5-diamino-4 tert-alkylbenzoates and 3,5-diamino-4 tert-alkylbenzonitriles. The patent indicates that the benzoate ester deactivates the ring to provide a longer pot life. Examples of chain extender agents are methyl 3,5-diamino-4-t-butyl benzoate and methyl 3,5-diamino-4-t-butyl benzonitrile.

SUMMARY OF THIS INVENTION

This invention pertains to an improvement in a process for forming polyurethane-urea elastomers by reacting an organic polyisocyanate with an organic compound having a molecular weight of from 400 to 10,000 and containing at least two Zerewitinoff hydrogen atoms and a chain extending agent comprising an aromatic diamine. In the improved reaction t-butylbenzenediamine is used at least as a component of the aromatic diamine chain extending agent.

Numerous advantages are observed when utilizing t-butylbenzenediamine as the aromatic chain extending agent or a component of a diamine chain extending agent for forming polyurethane-urea elastomers; these include:

an extension in pot life of the urethane-urea elastomer molding composition as compared to unsubstituted aromatic diamines as well as numerous alkyl substituted systems;

the formation of polyurethane urea elastomers which have good physical properties; and a variety of processing freedoms in forming castable elastomers from toluene diisocyanate systems.

DESCRIPTION OF THE DRAWINGS

FIGS. 1 and 2 are plots of viscosity in arbitrary units versus time of reaction for several chain extenders evaluated in a pot life tester.

DETAILED DESCRIPTION OF THE INVENTION

In accordance with the general practice of the invention, a polyurethane-urea elastomer is formed by reacting (a) an organic polyisocyanate; (b) a compound having active hydrogen atoms as determined by the Zerewitinoff method and (c) an aromatic amine chain extender. The general method in forming the elastomer is to form a prepolymer containing free isocyanate groups, typically from 1 to 25 percent by weight free isocyanate groups and then react the prepolymer with a stoichiometic quantity of aromatic amine chain extending agent. In this technique, the precent free isocyanate content of the prepolymer will vary depending upon the type of molding to be effected. In the manufacture of small; hard molded parts higher levels of free isocyanate may be tolerated, e.g. from 15 to 23 percent by weight. In the manufacture of large; soft components lower isocyanate content may be utilized, e.g. from 5 to 15 percent isocyanate by weight.

Another technique used in formulating polyurethane-urea elastomers is referred to as the one shot technique. In this type of manufacture, the reactants are blended in a nozzle and immediately injected into a mold. In many cases a portion of the polyol and amine are blended together prior to injection so that the proportions of components from each nozzle is balanced.

Polyisocyanates used as starting components for the urethane urea elastomers may be any of the aliphatic, cycloaliphatic, araliphatic, aromatic or heterocyclic isocyanates which are commonly used in the industry to form the polyurethane urea elastomer systems. As a general rule it is particularly preferred to use the aromatic polyisocyanates with the chain extender system described herein and these include toluene, 2,4- and 2,6-diisocyanate; others include polyphenyl-polymethylene polyisocyanate, diphenylmethane diisocyanate, naphthalene-1,5-diisocyanate and the like.

Reactant (b) used for forming the polyurethane-urea elastomer are compounds which have active Zerewitinoff hydrogen atoms. These typically are polyols, e.g. polyether and polyester polyols. Although the molecular weight of the compounds, i.e. a polyol normally used is from about 400 to 10,000 typically the molecular weight of the polyol ranges from 1,000 to about 6,000. Examples of polyols suited for forming polyurethane elastomers include polyether polyols such as poly(propylene glycol), poly(ethylene glycol), and poly(tetramethylene glycol) and polyester polyols. Polyester polyols are formed by reacting polycarboxylic acids with various polyols. These systems are well known in the art and include, for example, systems derived from polycarboxylic acids such as succinic acid, adipic acid, phthalic acid, isophthalic acid and polyols such as glycerol, ethylene glycol, propylene glycol, 1,4-butane diol, trimethylolpropane, and pentaerythritol. Also, polyether polyols can be reacted with the polycarboxylic acids to form the polyester polyols as mentioned in one process.

In the practice of this invention t-butylbenzenediamine is used as the chain extender for the polyurethane urea elastomer or as a component of the chain extender to provide urea groups within the elastomer. The small chain extender groups form "hard" segments in the elastomer and improve the structural stability and tensile modulus of the resulting polyurethane-urea elastomer. For purposes of this invention, it is preferred that the sole chain extending agent is t-butylbenzenediamine, but in many cases up to 50% of the equivalent weight of the chain extending system can comprise other aromatic diamines. The type and ratio of chain extending agent is selected on the basis of the properties desired, e.g. faster or slower reaction rate etc. Short or long chain polyols can also be formulated with t-butyl benzene diamine to produce a chain extender mix. Such polyols include ethylene glycol, propylene glycol, butane diol, glycerol and others conventionally used. The long chain polyols suited as a component for the chain extending system are those used for formulating the prepolymer. Typically, if a polyol is used as a component of the chain extender system, at least 25–75% of the equivalents NCO will be from t-butylbenzenediamine.

One of the advantages of using t-butylbenzenediamine as compared to other organo substituted derivatives of t-butylbenzenediamine is the ease of its manufacture. The composition t-butylbenzene is a commercially available composition and is typically prepared by Friedel-Crafts alkylation of benzene with isobutylene. The diamine then is formed by dinitrating t-butylbenzene, typically by a mixed acid technique, and then reducing the resultant dinitro-t-butylbenzene product. Reduction can be accomplished in a conventional manner such as used in the reduction of the dinitrotoluene to form toluene diamine. One technique for producing t-butylbenzenediamine from dinitro butyl benzene is shown in an article entitled Preparation and Construction of Some Tert-Butyl Acetamido Nitrobenzenes, Rec. Trav. Chim. 71,321–39 (1952) by Biekart et al. and is incorporated by reference.

EXAMPLE 1

Preparation of t-butylbenzenediamine

A chain extender, t-butylbenzenediamine, was prepared by initially adding 1.6 moles or 215 grams of t-butylbenzene to a vessel containing 304 grams of a 70% aqueous solution of nitric acid and 760 grams of a 98% aqueous solution of sulfuric acid. The t-butylbenzene was added slowly to this acid mixture with a constant agitation over a five hour interval while holding the temperature at 55° C. After all the t-butylbenzene was added, the reaction was allowed to continue for a period of about 2 hours at which time the reaction was deemed complete. Agitation was terminated and the organic phase separated from the aqueous phase. After washing with water 331 grams of a yellow liquid were recovered from the organic phase. The product was t-butyl-dinitrobenzene.

The diamine then was prepared by initially mixing 319 grams of the dinitro product from above with 1,860 grams of methanol and 6.1 grams of a palladium on carbon catalyst, the catalyst containing 5% palladium by weight. A 26 gram portion of water was added to the catalyst to facilitate transfer to a one gallon autoclave. Hydrogen was introduced to the autoclave and contacted with the mixture for four hours at a pressure of 500 psig. The initial temperature of the reaction was 26° C. and was then increased to 77° C. When no change in the hydrogen pressure was observed in the autoclave, the reaction was terminated and the reaction product filtered to remove residual catalyst. The filtrate was then subjected to evaporative distillation and an orange-red liquid (approximately 215 grams) was generated. The crude reaction product was fractionally distilled at 100° C. at a pressure $5 \times 10^{-3}$ millimeters mercury to remove residual by-products. Proton NMR was used to analyze the purified product and such analysis showed 95% 2,4-diamino-tert-butylbenzene and 5% 2,3-diamino-tert-butylbenzene. The total amine content was 12.02 milliequivalents per gram by amine titration with percholoric acid in glacial acetic acid. The theoretical amine content is 12.12.

EXAMPLE 2

A series of polyurethane-urea elastomer samples were developed for physical testing using hand-mix techniques. More specifically, an isocyanate capped prepolymer (Adiprene L-167) was degassed at 90°–100° C. under a pressure of 5–14 mm mercury. When bubbling ceased, the sample was ready for use. A preselected amount of isocyanate prepolymer at 75° C. and atmospheric pressure was then mixed with the chain extenders. In many cases the chain extenders comprised a mixture of aromatic diamine and poly(tetramethylene glycol) having a hydroxyl number of 166.2 and sold under the trademark TERACOL 650 by the duPont Company. The resulting mixture was then poured into an aluminum mold and cured at 100° C. at 2500 psig in a hydraulic press. After two hours the samples were demolded and cured in an air oven for 22 hours at 100° C. Postcuring was effected at ambient conditions 25°–30° C. for seven days. Prior to testing, samples were conditioned at 23±2° C. at 50±5 relative humidity for 24 hours.

Tables 1 and 2 provide test data with respect to physical testing of elastomers having various ratios of molar-/equivalents NCO/OH/NH$_2$ as well as the utilization of various aromatic diamines and chain extender mixes. The physical properties in terms of tensile modulus, tensile strength at break, elongation at break, tear resistance, durometer hardness and compression set were measured in accordance with ASTM methods. More specifically, the tensile strength at a given elongation and at break was measured in accordance with ASTM D-412; tear resistance according to ASTM D-624(Die) C; durometer hardness according to ASTM D-2240; (compression set under constant deflection) ASTMD-3956 (Method B).

TABLE 1

| Run | Isocyanate | Polyol | % NCO | Isocyanate Prepolymer(g) | Chain Extender(g) | Polyol(g) | Mole Ratio NH$_2$/NCO/OH |
|---|---|---|---|---|---|---|---|
| 1 | Adiprene L-167 | Teracol 650 | 5.91 | 83.3 | chloro TDA (6.8) | 9.9 | 1.5/2/0.5 |
| 2 | " | " | " | 83.0 | DEBDA (7.2) | 9.9 | " |
| 3 | " | " | " | 82.5 | DETDA (7.7) | 9.8 | " |
| 4 | " | " | " | 84.5 | TDA (5.4) | 10 | " |
| 5 | " | None | " | 89.6 | TBBDA (10.4) | — | 2/2/0 |
| 6 | " | None | " | — | MOCA | — | 2/2/0 |

Glossary
chloro-TDA = chlorotoluenediamine
DEBDA = diethylbenzenediamine (mixed isomers)
DETDA = diethyltoluenediamine
TDA = toluenediamine (mixture 80% 2,4- and 20% 2,6-isomers)
TBBDA = t-butylbenzenediamine
MOCA = 4,4'-methylene-bis-(orthochloroaniline)

TABLE 2

| Run | Tensile Modulus @100%/lbs/in$^2$ | Tensile Modulus 300%/lbs/in$^2$ | Tensile at break lb/in$^2$ | Elongation at break % | Tear Resistance (lb/in) | Durometer Hardness Shore A | Compression Set (%) 22 hrs. 70° C. |
|---|---|---|---|---|---|---|---|
| 1 | 790 | 1700 | 2800 | 450 | 400 | 79 | 13 |
| 2 | 712 | 1100 | 1400 | 420 | 410 | 86 | — |
| 3 | 900 | 1300 | 2600 | 570 | 480 | 89 | — |
| 4 | 1100 | 1400 | 1900 | 460 | 520 | 89 | — |
| 5 | 1000 | 2400 | 5800 | 650 | 400 | 91 | — |
| 6 | 1600 | 3400 | 4900 | 447 | — | — | — |

The results from Tables 1 and 2 indicate that some polyol had to be incorporated in all systems utilizing an aromatic diamine chain extender other than t-butylbenzenediamine. This was necessary in order to extend gelation time and permit hand mixing and molding. Because of the polyol presence in the chain extender, the resulting elastomer had reduced tensile modulus at all levels. Systems using MOCA did not require polyol to extend gelation time and those systems gave comparable modulus results to t-butylbenzenediamine systems.

EXAMPLE 3

A series of polyurethane-urea elastomers utilizing various chain extenders were prepared and evaluated for pot life in a pot life test system and other physical properties. The polyurethane-urea elastomers were formulated by reacting a prepolymer of poly(1,4-oxytetramethylene)glycol end-capped with 2,4-toluene diisocyanate, the prepolymer having an NCO content of 5.91% with a chain extender mix of poly (E-caprolactone) diol having a hydroxyl number of 204.5 and aromatic diamine. The nominal stoichiometic equivalent ratio of polyol to isocyanate and chain extender for each sample is 1/2/1. Commercially, the prepolymer is marketed under the trademark ADIPRENE L-167 by the E. I. duPont de Nemours Company and the poly(E-caprolactone) diol marketed under the designation CAPA 200 by Interox Chemicals Limited.

The test system for measuring pot life comprised a heated test chamber for holding 7 grams of test sample at a constant temperature (50° C.) and was equipped with a vertical perforated piston. This piston moves up and down through the test sample in timed relationship. (The temperature rise due to the exothermic reaction is discounted.) The force necessary to move the piston through the polymer sample is measured in arbitrary units, and the relationship of the force is plotted as a function of time. The force-pot life relationship of the urethane system during cure then is correlated to known force-viscosity relationships for the urethane-urea systems.

Table 3 represents tabular data providing coefficients for the empirical model expressing the natural logarithm of viscosity as a third-power polynomial function of time for several chain extender systems. The coefficients apply to the equation:

$$Ln(\text{viscosity}) = K + a(\text{time}) + b(\text{time})^2 + c(\text{time})^3.$$

The initial slope of the viscosity/time graph was calculated by differentiating the antilog form of the above equation at time zero. The initial slopes reflect the reaction rates and pot lives of the polyurethane-urea systems. The coefficient of the first power term ("a") is a "quasi" reaction rate constant. Smaller valves of initial slopes and the "quasi" rate constant (a) indicate longer and desirable pot lives.

pared to an isopropyl group or 2 alkyl groups, i.e. the diethyl and diisopropyl groups. The coefficient (a) in the equation for t-butylbenzenediamine is low compared to the coefficients for diethyltoluenediamine and for isopropylbenzenediamine. This is indicative of a more gradual and longer pot life for t-butylbenzenediamine than for diethyltoluenediamine and ispropylbenzenediamine. The coefficient also shows the slope of the curve did not change dramatically as a function of time; this is not reflected in the initial slope valve.

What is claimed:

1. In a process for the production of polyurethane urea elastomers comprising reacting:
    (a) organic polyisocyanate;
    (b) organic compounds having molecular weights of from 400–10,000 and containing at least two Zerewitenoff active hydrogen atoms; and
    (c) an aromatic diamine as a chain extending agent; the improvement wherein at least a portion of the aromatic diamine used as a chain extender is t-butylbenzenediamine.

2. The process of claim 1 wherein at least 50% of the equivalent weight of the total amount of aromatic chain extender employed is provided by t-butylbenzenediamine.

3. The process of claim 2 wherein the t-butylbenzenediamine extender is incorporated in an equivalent amount of at least 25 to 75 percent of the equivalent weight of the chain extender system.

4. The process of claim 2 wherein said polyurethane urea elastomers are formed by reacting a prepolymer of said isocyanate and organic compound having an isocyanate content of 1 to 25% by weight and then reacting said prepolymer with said chain extender comprising t-butylbenzenediamine.

TABLE 3

Empirical Model of Pot Life
Ln (viscosity) = k + a(time) + b(time)$^2$ + c(time)$^3$

| Chain Extender | Curve FIG. 1 | K | a | b | c | R$^{2**}$ | Initial Slope |
|---|---|---|---|---|---|---|---|
| Chloro-Toluenediamine | 6 | 4.4970 | 0.3096 | −.0122 | .0002 | .9909 | 28 |
| tert-Butylbenzenediamine | 3 | 4.6353 | 0.7019 | −.0978 | .0060 | .9679 | 72 |
| Diethyltoluenediamine | 2 | 4.3859 | 1.7089 | −.2901 | .1412 | .9899 | 137 |
| isopropylbenzenediamine | 4 | 4.1944 | 5.1170 | −3.2911 | 0.9339 | .9767 | 339 |
| Diethylbenzenediamine | — | 3.9985 | 6.3641 | −3.6785 | 2.1125 | .9734 | 347 |
| 2,4-Toluenediamine | 1 | 4.3850 | 6.5484 | −4.4226 | 1.5387 | .9846 | 525 |
| Mesitylenediamine | 5 | 3.6867 | 7.4875 | −17.3439 | 21.9834 | .9654 | 299 |
| 3,4-Toluenediamine | — | 4.5201 | 7.7647 | −7.1246 | 4.2451 | .9962 | 713 |
| meta-Xylenediamine | — | 4.1352 | 9.6389 | −16.0387 | 44.1831 | .9829 | 602 |
| Diisopropyl-Benzenediamine | — | 3.6116 | 12.4888 | −25.6809 | 33.3414 | .9746 | 462 |
| para-Xylenediamine | — | 3.8931 | 12.9991 | −45.1656 | 77.1519 | .9912 | 638 |
| 2,6-Toluenediamine | — | 4.1451 | 13.5986 | −86.5134 | 282.1959 | .9771 | 858 |

**R measures how much variation in the dependent variable can be accounted for by the model.

In summary, FIGS. 1 and 2 show that the changes in slope are gradual for the pot life. One of the surprising aspects of the results in terms of initial slope from Table 3 and FIGS. 1 and 2 pertaining to pot life is the retardation effected by a single tertiary butyl group as com- 5. The process of claim 4 wherein said isocyanate is toluene diisocyanate.

* * * * *